United States Patent [19]
Morton et al.

[11] Patent Number: 4,829,422
[45] Date of Patent: May 9, 1989

[54] CONTROL OF MULTIPLE PROCESSORS EXECUTING IN PARALLEL REGIONS

[75] Inventors: Milton A. Morton, Merrimac; Peter A. Darnell, Westford; Lee W. Cooprider, Waban; Gary Bray, Somerville, all of Mass.

[73] Assignee: Stellar Computer, Inc., Newton, Mass.

[21] Appl. No.: 34,084

[22] Filed: Apr. 2, 1987

[51] Int. Cl.⁴ .............................................. G06F 15/16
[52] U.S. Cl. ................................................... 364/200
[58] Field of Search .................... 364/200, 300, 900

[56] References Cited

U.S. PATENT DOCUMENTS

| | | | |
|---|---|---|---|
| 3,916,383 | 10/1975 | Malcolm | 340/172.5 |
| 3,934,232 | 1/1976 | Curley et al. | 340/172.5 |
| 3,972,029 | 7/1976 | Bailey, Jr. | 340/172.5 |
| 3,980,992 | 9/1976 | Levy et al. | 340/172.5 |
| 4,152,763 | 5/1979 | Shimoi | 364/200 |
| 4,197,579 | 4/1980 | Otis, Jr. et al | 364/200 |
| 4,354,227 | 10/1982 | Hays, Jr. et al. | 364/200 |
| 4,365,311 | 12/1982 | Fukunaga et al. | 364/900 |
| 4,594,655 | 6/1986 | Hao et al. | 364/200 |
| 4,622,631 | 11/1986 | Frank et al. | 364/200 |
| 4,625,294 | 11/1986 | Banks | 364/900 |
| 4,636,942 | 1/1987 | Chen et al. | 364/200 |
| 4,661,900 | 4/1987 | Chen et al. | 364/200 |
| 4,754,398 | 6/1988 | Pribnow | 364/200 |

OTHER PUBLICATIONS

K. Hwang, Computer Architecture and Parallel Processing, 1984, pp. 484-485.
Denelcor, "Heterogeneous Element Processor", Part No. 9000001v, pp. 2-1-3-6, Apr. 1981.

Primary Examiner—Raulfe B. Zache

[57] ABSTRACT

Multiple processors are enabled to regulate their work within sections of a machine instruction sequence by storing status information about the state of execution of the parallel regions by the processors, and including, in the machine instruction sequence, parallel control instructions which enable each processor to proceed from section to section on the basis of the status information, without interrupting the execution of the machine instruction sequence.

11 Claims, 6 Drawing Sheets

CONTROL OF MULTIPLE PROCESSORS EXECUTING IN PARALLEL REGIONS

BACKGROUND OF THE INVENTION

This invention relates to regulating the work of multiple processors within parallel regions of a machine instruction sequence.

A parallel region is one which contains independent blocks that can be executed concurrently by different processors to produce the same result as when all blocks are executed by a single processor. A given machine instruction sequence may include any arbitrary arrangement of parallel regions.

Some types of instruction sequences can be executed by a technique in which identical copies of the sequence are loaded into all of the processors. A central controller steps the processors through the sequence; for each instruction in the sequence, the controller causes each processor either to execute the instruction or to bypass execution of the instruction.

In another approach, applicable for example to the iterations of a do loop, a central controller assigns different iterations to different processors.

In a more broadly applicable scheme, the segments of code are stored in memory; a central scheduler picks up each segment of code in turn and delivers it to a processor for execution.

SUMMARY OF THE INVENTION

A general feature of the invention enables multiple processors to regulate their work within sections (e.g., parallel regions) of a machine instruction sequence, by storing status information about the state of execution of the sections and by including (in the machine instruction sequence) parallel control instructions which enable each processor to move from section to section based on the status information, without interrupting the execution of the machine instruction sequence.

Preferred embodiments of the invention include the following features.

The status information includes a flag indicating when a region has been completely executed, and the parallel control instructions cause the processor which is the last processor to leave the region upon its completion to set the flag; other processors are prevented from thereafter entering the parallel region, as the result of consulting the flag. Each parallel region includes independent blocks that can be executed respectively by different processors such that conflicts between the processors executing the blocks are precluded as a result of consulting information stored in one of a plurality of register sets assigned in common to the processors; the status information includes a value that indicates which register set has been assigned to processors executing in the parallel region; and the parallel control instructions cause each processor, when entering a parallel region where another processor is working, to assign to itself the same register set assigned to the other processor, based on the register set indicator value. The status information also includes the number of processors that are actively executing within each region, and the number is incremented and decremented by processors entering and leaving the region. The status information is contained in a parallel region descriptor and there is one parallel region descriptor for each parallel region in the machine instruction sequence. When all processors have temporarily left a region before execution of the region has been completed, the information in the register set is temporarily stored as part of the status information in the shared storage, and is reloaded in the register set when execution of the parallel region resumes. The parallel region instructions include an enter parallel region instruction at the beginning of the region, executed by each processor that reaches said region, and an exit parallel region instruction executed by each processor that leaves the region after completing a block.

The invention enables multiple processors to efficiently and consistently govern their execution of parallel regions of any arbitrary machine instruction sequence by means of instructions that appear in the sequence itself, without interrupting the execution of the sequence. Effective use may be made of dynamically shared register sets to control the execution of blocks within each parallel region.

Other advantages and features will become apparent from the following description of the preferred embodiment, and from the claims.

DESCRIPTION OF THE PREFERRED EMBODIMENT

We first briefly describe the drawings.

STRUCTURE AND OPERATION

Figure 1:
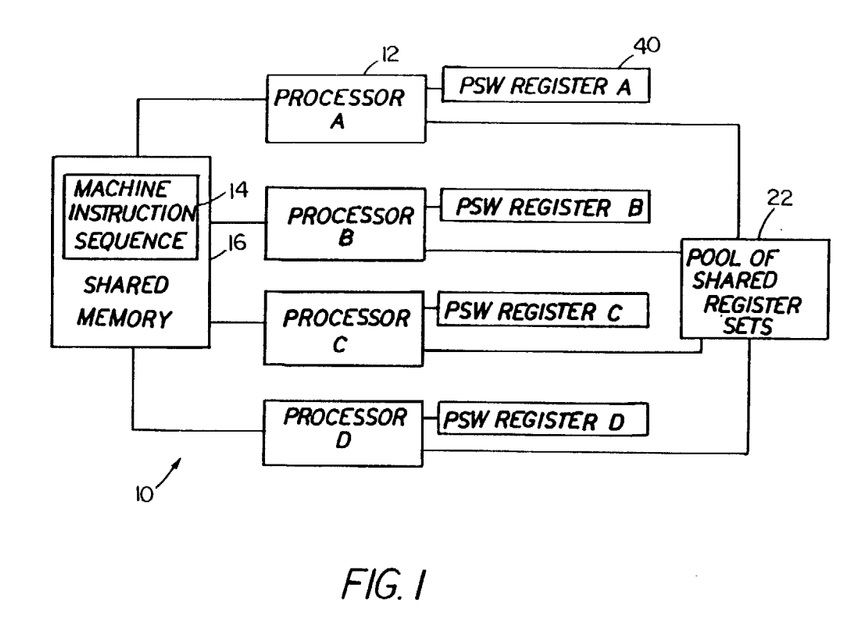
FIG. 1 is a block diagram of a multiple processor computer.

Referring to FIG. 1, in one example of a multiple processor computer system 10, four processors 12 (labeled respectively A, B, C, D) are available to execute a machine instruction sequence 14 held in a shared memory 16.

Figure 2:
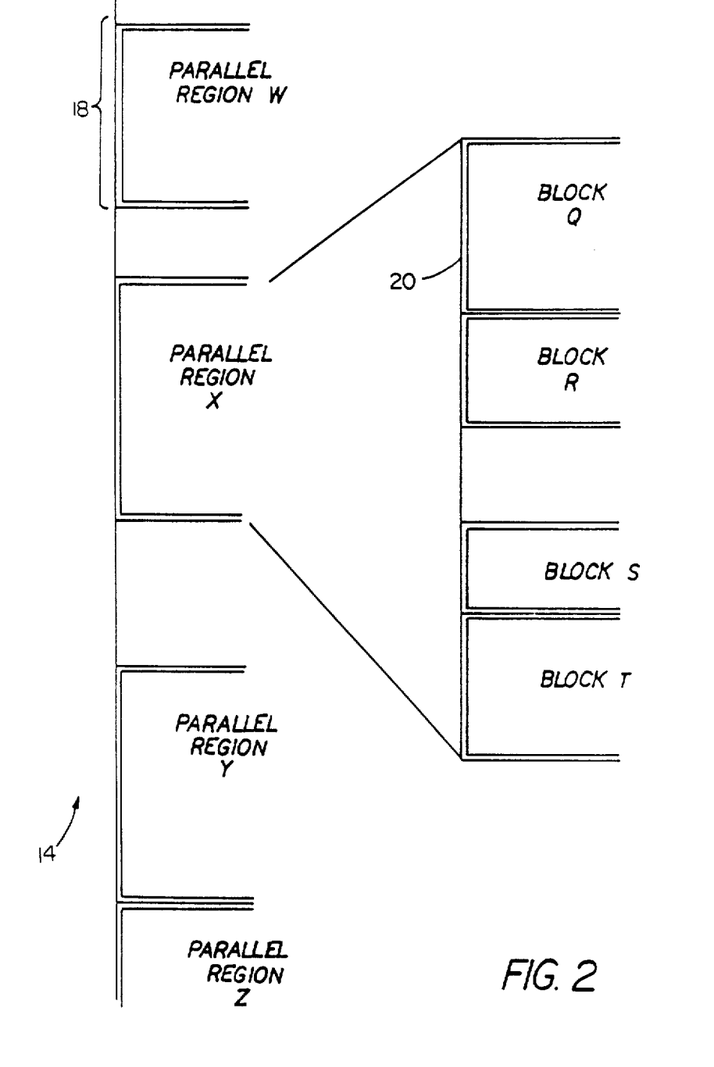
FIG. 2 is a diagram of parallel regions and blocks in a machine instruction sequence.

Referring to FIG. 2, machine instruction sequence 14 may include one or more parallel regions 18 of machine instructions (representative parallel regions are labeled W, X, Y, Z). A given parallel region X has two or more blocks 20 of machine instructions (representative blocks are labeled Q, R, S, T) which are independent in the sense that the same result is obtained whether one processor executes all blocks in the parallel region, or different processors execute different blocks (e.g., processor A executes block Q, C executes R, and D executes S and T).

The system 10 is capable of executing from one up to four processes simultaneously. (A process, as commonly defined, is a sequence of machine instructions and information about the state of its execution). Each process may be capable of being split up for execution among more than one of the processors. The portion of a process executing on a given processor at a given time may be called a thread. Thus a process is a collection of threads. Threads enter and leave parallel regions from time to time.

Referring again to FIG. 1, in order to regulate the work of the four processors within the machine instruction sequence 14, computer system 10 includes (as a shared resource) a pool 22 of high-speed register sets shared in common by the four processors.

Figure 3:
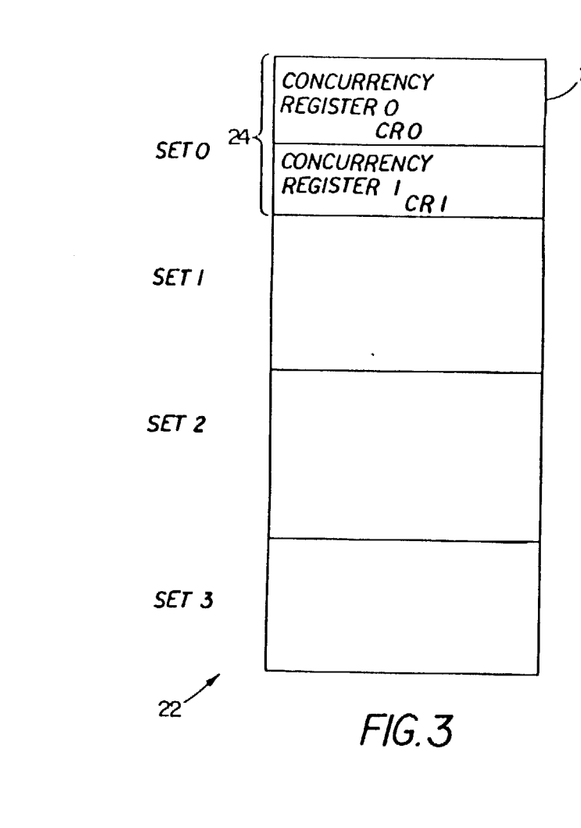
FIG. 3 is a diagram of shared register sets.

Referring to FIG. 3, pool 22 includes as many register sets 24 as there are processors (in this case four, labeled respectively 0, 1, 2, 3). All of the register sets 24 have the same number (two) of 32-bit registers 26. The two registers in a set are called concurrency registers 0 and 1, i.e., CR0 and CR1. Any of the four register sets can be dynamically assigned to a processor as it enters a parallel region 18, as explained below. For example, sets 0, 1, 2, 3 may be assigned at a given time to processors A, B, C, D, respectively.

As a processor enters a parallel region it is assigned either a currently unused register set (if no processor is actively working in the region) or the register set already assigned to processors working in the region being entered. As a processor leaves a region the assignment of the register set to it is terminated. As long as at least one processor is actively working in a parallel region, the register set assigned to that processor is, of course, unavailable for reassignment. However, when no processor is currently active within a region, the register set previously associated with that region is free to be dynamically reassigned for use by other processors.

The assignment and reassignment of register sets to processors is accomplished dynamically by the processors themselves in the course of (and without interrupting) the normal execution of the machine instruction sequence. To accomplish this, the compiler inserts assignment instructions at appropriate locations in the machine instruction sequence.

There are several types of assignment instructions. One type of assignment instruction enables a processor to find an available currently unused register set and assign that set to itself, or to assign itself to the same register set currently in use by another processor so that those two processors can share the information in the register set. Another allocation instruction causes a processor to terminate the assignment of a register set to that processor. When all processors to which a register set had been assigned terminate the assignment, the register set becomes freed for reassignment. Because all of the register sets have the same configuration it is irrelevant which particular register set becomes assigned to the processors working in a region at a given time. The dynamic assignment and reassignment reduces overhead cost and permits a relatively small number of register sets to be used.

Referring again to FIG. 1, each processor has an associated non-shared PSW register 40 which holds a program status word (PSW). The PSW includes information pertinent to the thread currently executing on the associated processor, including the identity of the register set assigned to the processor.

Figure 4:
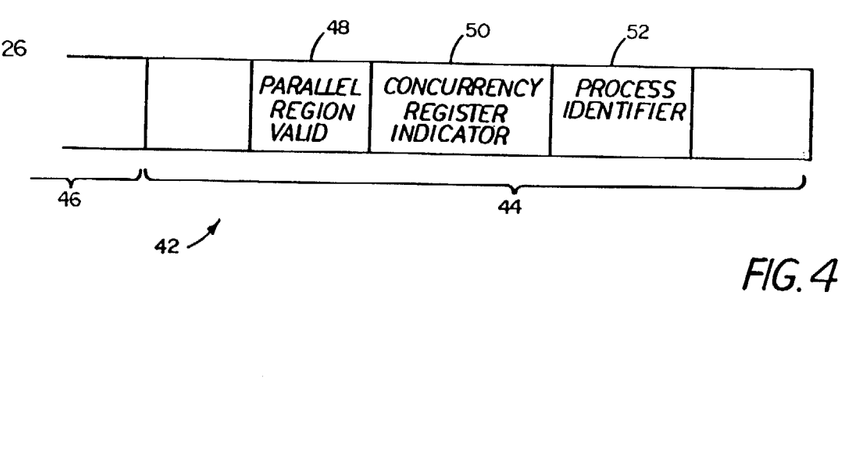
FIG. 4 is a diagram of a portion of a program status word.

Referring to FIG. 4, the PSW 42 has both a protected (unaccessible to the user) portion 44 and an unprotected portion 46. The protected portion 44 includes: a one-bit parallel region valid (PRV) field 48; (which is set when the CRI and PID fields, described below, are valid); a two-bit concurrency register indicator (CRI) field 50 which identifies the register set (0, 1, 2, or 3) assigned to this processor (CRI is valid only if PRV is set); and a two-bit process identifier (PID) field 52.

Each of the four (or fewer) processes which may be executing concurrently on computer system 10 is assigned a unique identifying value called a process identifier (PID), which is stored in PID field 52. The PSWs of all threads presently executing on behalf of the process are assigned the PID of that process.

A wide variety of possible combinations of processes and threads executing in parallel regions may occur.

In a simple example, there are four processes, each with a single thread executing on one of the processors in one corresponding parallel region. Then there are four different PIDs (0, 1, 2, 3) (identifying the four different processes) and four different CRIs (3, 2, 1, 0) in the four PSWs (identifying the four different register sets).

In a second example, a single process has four threads that are executing (respectively on the four processors) in four different parallel regions. Then there are four different CRI values (0, 1, 2, 3) in the four different PSWs, and the same PID value (e.g., 2) appears in all four PSWs.

In a third example, a single process has four threads executing (on the four processors) within a single parallel region. All four threads then share the same CRI value (e.g., 3) and a single PID value (e.g., 2).

Now suppose there are four executing processes each with a single thread and one process (e.g., the process identified by PID 3) reaches a stopping point, freeing up the processor on which its thread was executing in a parallel region. If the newly available processor takes up a second thread of one of the other processes (e.g., the process identified by PID 2) and begins executing in a parallel region that is already being worked in by another processor, that second thread is assigned the same CRI value (0) as the processor already operating in the region. This is accomplished in a manner described below.

The actual information stored in a register set and shared by the processors to which the set is assigned may be of any kind. In the particular case of processors operating in parallel regions, however, the information may concern the status of the execution of independent blocks by processors operating within the region. Then the information may take the form of bits that keep track of which blocks have been partly or fully executed. The information needs to be updated as processors enter and leave parallel regions and must be retained and recovered at times when all processors have temporarily left an unfinished parallel region (thus freeing up the register set for reassignment). The same instructions by which the register sets are assigned and reassigned to processors may be used to retain and recover the status information contained in the register set.

In order to keep track of the status of execution of each parallel region, the compiler establishes for each parallel region an associated parallel region descriptor (PRD) which is stored at a specific location in shared memory 16.

Figure 5:
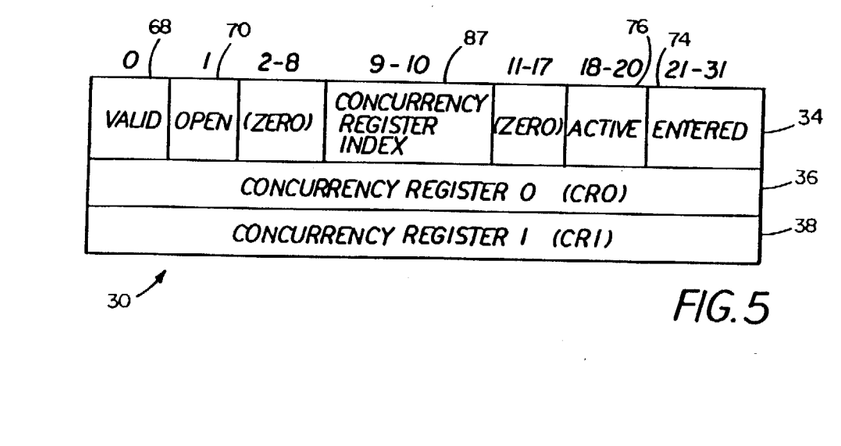
FIG. 5 is a diagram of a parallel region descriptor.

Referring to FIG. 5, each PRD 30 includes three 32-bit words 34, 36, 38.

The first word 34, called a control word, includes five fields as follows.

A one-bit flag V1 (valid) (68) is set to indicate when the PRD contains valid information. V1 is set during initialization and is cleared when the last to leave of all threads that entered the parallel region has permanently left the region (meaning that the entire region has been executed).

A one-bit flag Op (open) is set to indicate that there is a block (e.g., a section of code or an iteration of a loop) within the region that has not been started. This saves time by preventing a thread from entering a region when all of the work in the region has been started (although not necessarily finished). Op is set at initialization and is cleared by the first processor to exit the region upon reaching the end of the region.

A two-bit field (concurrency register index) CRI 87 identifies which one of the four shared register sets 24 is currently assigned to processors working in the region. CRI is zeroed at initialization.

An eleven-bit field Entered 74 keeps a count of the number of threads that have successfully entered the parallel region and have not left permanently (although they may have left temporarily). Thus Entered begins at zero, is incremented each time a thread (not previously active in the region) enters, is decremented each time a thread permanently leaves the region, and reaches zero again when execution of the parallel region is complete.

A three-bit field Active 76 counts the number of threads that have entered and are currently actively working in a parallel region. Active cannot be larger than the number of processors (e.g., four) and Entered is typically slightly larger than Active. Active is initialized at zero and becomes zero again whenever no threads are actively working in a region; this event is a signal that the register set currently associated with the parallel region can be released and reassigned.

The second and third words 36, 38 of the PRD are 32-bit words that correspond to the two registers in each register set. The 64 bits of the two words can be used in various ways. One way is to set, e.g., one of the bits when a block of instructions within the parallel is entered. The bit acts as a flag to indicate to later entering processors that the block is being executed by another processor. In the case of loops, one or more of the bits can be used as a counter to indicate how many iterations of the loop remain. The compiler inserts into the machine language instruction sequence instructions which can set and test the various bits in CR0 and CR1 to accomplish the desired result, as explained more fully below. The bits of CR0 and CR1 are initialized to zero and the loop counters are initialized to their starting values.

The second and third words of the PRD serve first as a place to store the 64 bits when they are initialized. Whenever a register set becomes associated with a parallel region, the 64 bits are loaded from the corresponding PRD to the register set. While the register set remains assigned, the 64 bits are updated in the register set by the set and test instructions included in the machine instruction sequence. When a register set is released for reassignment, the 64 bits are stored temporarily in the PRD for reloading to the register set which next becomes associated with that parallel region (the next time a thread enters it).

There are four different instructions that the compiler either includes in the machine instruction sequence itself (or otherwise causes to be executed at appropriate times, e.g., when a processor is interrupted) in order to control (1) the dynamic assignment and reassignment of the shared register sets, (2) the updating of the PRDs to regulate the execution of the parallel regions, and (3) the updating of the relevant fields of the PSW registers. All four instructions are atomic, i.e., they are executed by a processor on a memory location or register, and the results are stored back in that location or register, in such a way that no other processor can access the location or register during the execution.

The four instructions are: (1) enter parallel region (EPR) which is executed by a processor when its thread first enters the parallel region; (2) suspend parallel region (SPR) which is executed under command of the operating system when a processor temporarily exits a parallel region leaving no processor then actively working in the region; (3) resume parallel region (RPR) which is executed under command of the operating system when a processor reenters a previously suspended parallel region; and (4) exit parallel region (XPR) which is executed by a processor that exits a parallel region that has been completely executed.

Figure 6:
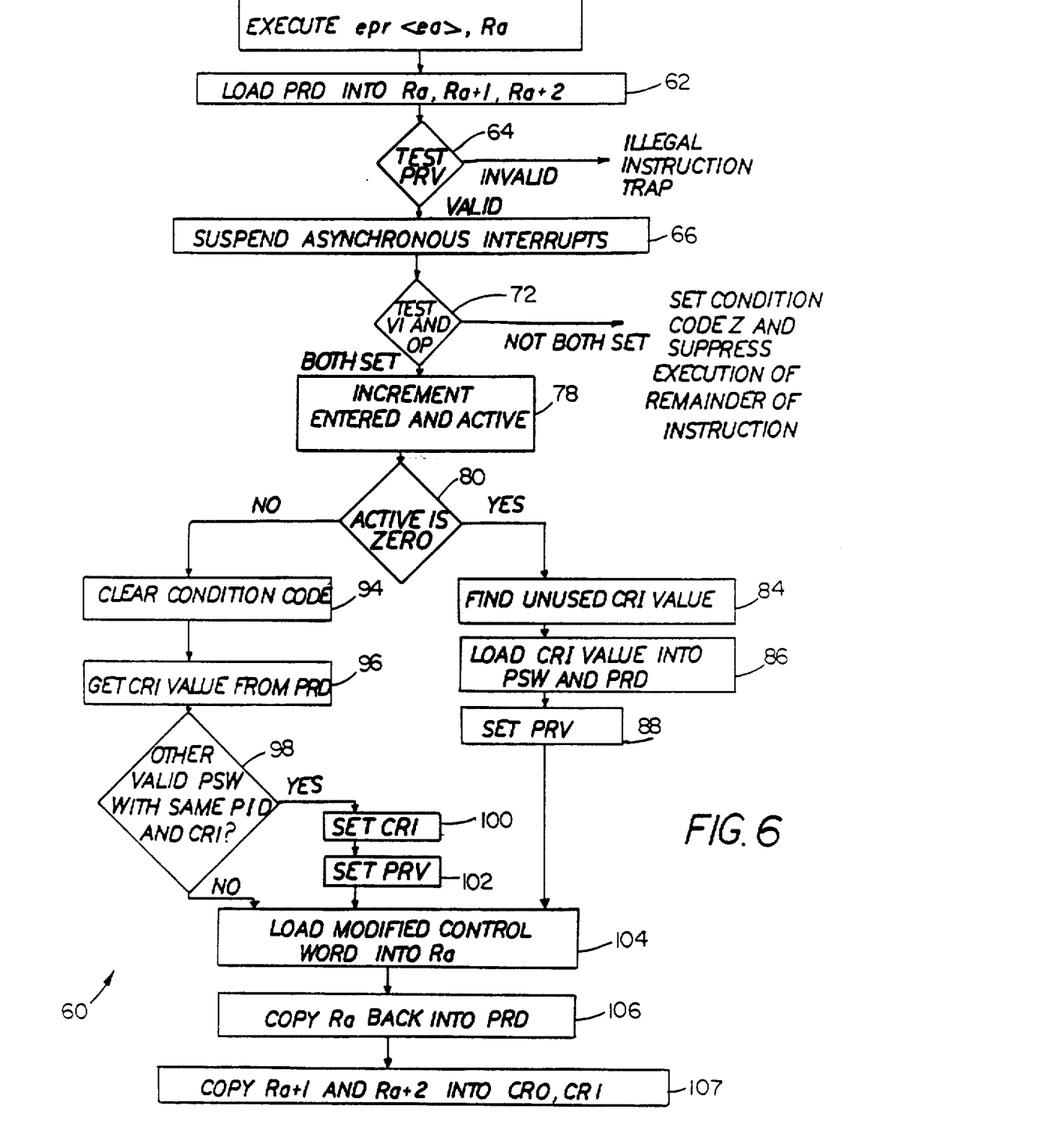
FIGS. 6, 7 are flow diagrams of register set assignment instructions.

Referring to FIG. 6, the EPR instruction 60 includes two operands: ea, which is the address of a shared memory location containing the PRD assigned to the parallel region, and Ra, which identifies three registers (Ra, Ra+1, and Ra+2) that are used to store the three words of the PRD temporarily while they are being manipulated. When EPR is executed, the PRD first is loaded (62) into Ra, Ra+1, and Ra+2. The PRV field in the PSW of the processor whose thread is entering the parallel region is tested (64). If invalid, the execution terminates with an "illegal instruction" trap. Asynchronous interrupts are suspended (66). Next the V1 and Op fields 68, 70 (FIG. 4) are tested (72). Unless both fields are set (indicating that the PRD is valid, i.e., contains useful information, and includes a block that has not yet been started), a condition code Z for this processor is set (condition code Z is cleared to indicate when a processor has successfully entered a parallel region and is set to indicate that a processor has not successfully entered a parallel region or has left a parallel region) and execution of the remainder of the instruction is suppressed. If both fields are set, the condition code Z is cleared, the Entered and Active fields 74, 76 (FIG. 4) are incremented (78) to indicate that an additional processor will enter (for the first time) and be active in the parallel region.

If the Active field is zero (80) (indicating that this processor will be the only one active in this region), a currently unused CRI value is found (84) by looking at the CRIs in the PSWs of the other processors (note that because there are as many shared register sets as processors, an unused CRI is guaranteed to be found). The unused CRI value is then loaded (86) into the CRI field of the processor's PSW and into the CRI field 87 (FIG. 4) of the PRD (which alerts all future processors entering the parallel region of the shared register set to be used). The PRV bit in the PSW is set (88).

If Active was not just zero (at least one other processor was active in the region), the condition code Z is cleared (94); the CRI value in the PRD is fetched (96); and the other PSWs are searched (98) to see if the ones in which PRV is set have the same PID and CRI values. If so, that CRI value is loaded (100) in the PRD and PRV is set (102); otherwise CRI and PRV are left unchanged. This prevents a thread from adopting a CRI unless other threads using the same CRI value also have the same PID. By assigning a unique PID to the PSWs of all processors executing in a parallel region, and by preventing PSWs having different PIDs from sharing the same register set it is assured that processes will not interfere with each other. When a processor begins executing a process, the operating system (which itself is being executed by one of the processors) assigns it a unique PID. The PID associated with each thread of that process is set with the unique PID for that process.

When a thread is completed (or interrupted) the PID is cleared from the PSW.

Finally, the now modified control word of the PRD in Ra is copied back (106) into the PRD, and Ra+1 and Ra+2 are loaded (107) into CR0 and CR1.

The execution of the RPR instruction is identical to the execution of the EPR instruction except that Entered is not incremented (because this is not the first time the thread has entered the parallel region), and Op and V1 are not tested because V1 is presumed set and even if Op is set, the thread should enter the region to complete work previously begun.

Figure 7:
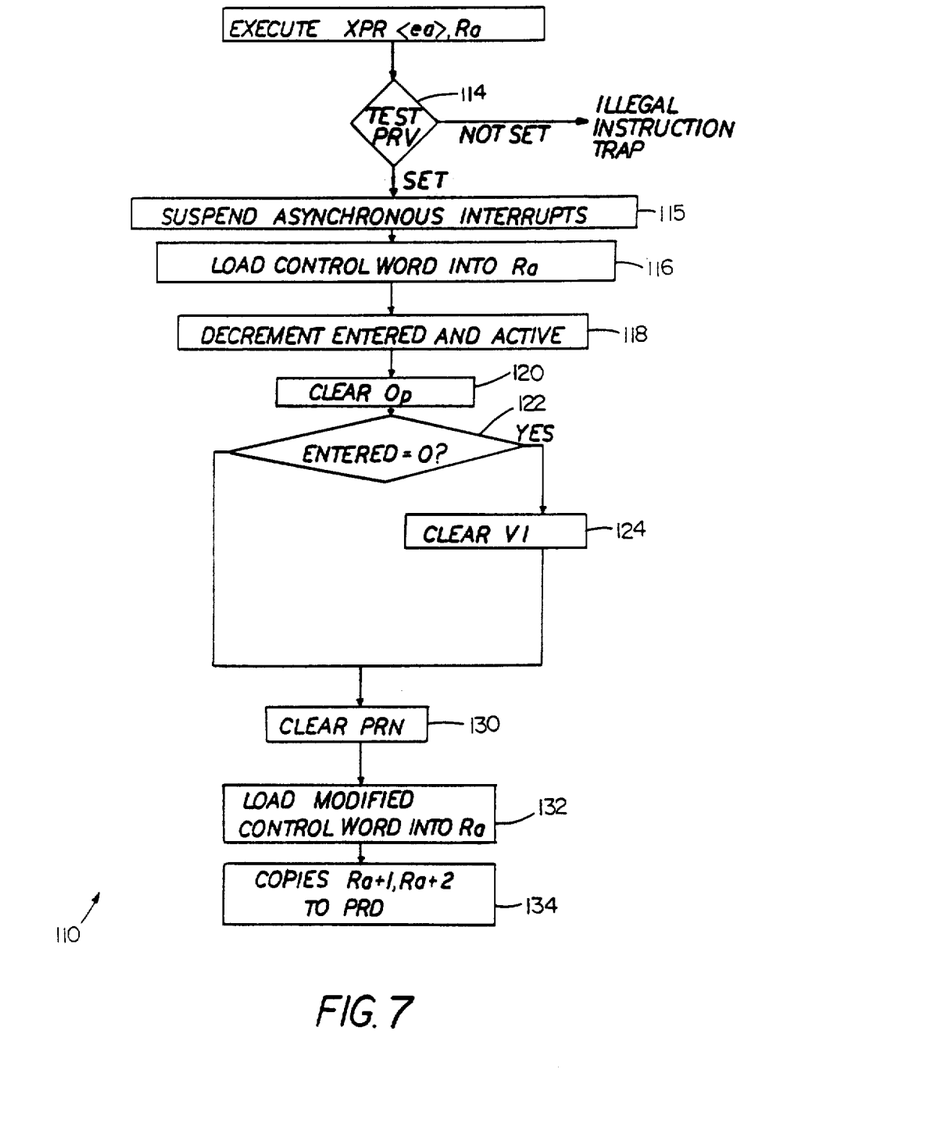

The XPR instruction likewise has the two operands ea and Ra. Referring to FIG. 7, PRV is tested (114) and if not set, an "illegal instruction" trap is triggered. If PRV is set, asynchronous interrupts are suppressed (115), and the control word of the PRD (found at address ea) is loaded (116) into Ra. Entered and Active are each decremented (118) to indicate that one fewer processor is actively working in the region and one fewer thread has unfinished work in the region. OP is cleared (120) to indicate that no unstarted work exists in the parallel region (if there were unstarted work this thread would enter it rather than leaving the parallel region). If Entered is now zero (122) (indicating all threads have permanently left the parallel region), V1 is cleared (124) (to indicate that the PRD no longer contains useful information). In either case, the PRV is cleared (130) indicating that the thread s PSW fields are no longer valid, the modified control word of the PRD is loaded (132) into Ra, and Ra+1 and Ra+2 are copied back to shared memory (134) at address ea.

The execution of the SPR instruction is identical to the execution of the XPR instruction except that it does not decrement Entered (because this thread is not finished in the parallel region) and does not clear Op (because the parallel region has not been completed).

The purpose for suppressing asynchronous interrupts is to assure the atomicity of the instructions, so that no other processor can modify the most recent values of the shared register set while the execution of the parallel region instruction proceeds.

Figure 8:
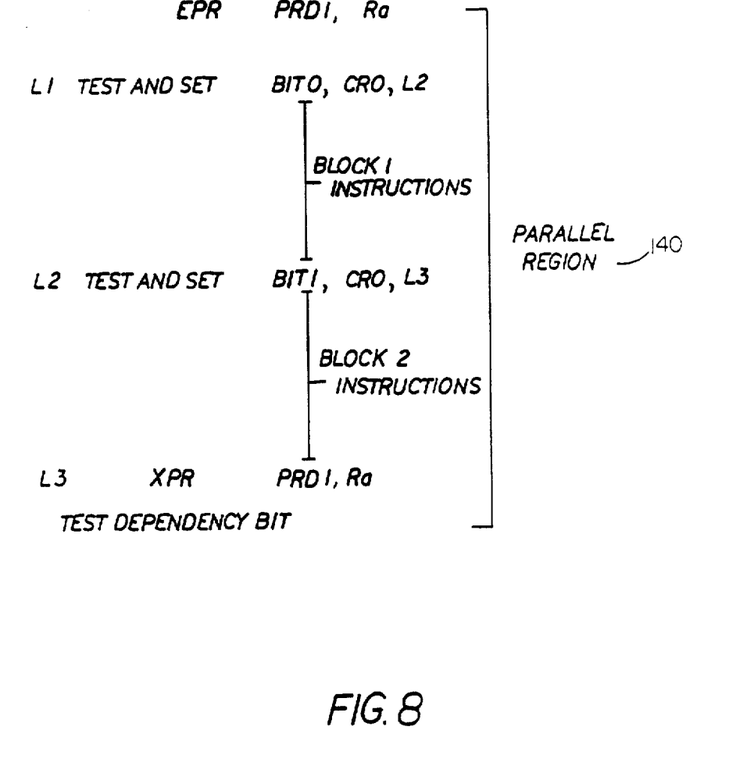
FIG. 8 is a diagram of a parallel region.

Referring to FIG. 8, each parallel region 140 begins with an EPR instruction, which points to a PRD address, in this case the address of PRD1. When a processor enters the parallel region, it executes the EPR instruction in the manner previously described. Parallel region 140 has two independent blocks.

Each block begins with a so-called test and set instruction. The first processor to enter the parallel region executes the test and set instruction by testing the 0 bit of the first register (CR0) of the register set that was assigned to the processor when it executed the EPR instruction. It will find that bit to have a zero value (the bit was initialized to zero). The result of finding the bit value to be zero is that the processor simply proceeds directly to the subsequent code in block 1.

Now, suppose that while the first processor is working in the first block a second processor enters the parallel region for the first time. It too executes the EPR instruction which causes it to be assigned the same register set as the first processor. It next executes the test and set instruction at line L1. Now the bit 0 in CR0 is set to 1 and this will cause the processor to branch to instruction L2 at the beginning of the second block. The effect of that instruction is to set bit 1 in CR0 to 1 and cause the processor to proceed into the second block.

Now if a third processor enters the parallel region, it will find, when it executes the EPR instruction that the Op field of PRD1 is cleared, indicating that there is no work in this parallel region that has not already been started. Accordingly, it will not enter this region. Once the second processor reaches the end of the second block it executes the XPR instruction in the manner previously described. Thus it can be seen that the compiler can allocate the register set to the various blocks in a region in advance, without knowing which particular register set will be used during execution. It does so by inserting the appropriate test and set type instructions in the blocks of the region.

When a processor is interrupted in its work within a block, or returns to a block after an interruption, the operating system causes the SPR or RPR instruction to be executed based on the status of the processor's PSW PRV bit.

When a processor reaches the end of its work in a parallel region and executes the XPR instruction, it may be precluded from proceeding until other processors in the parallel region have completed their work. A dependency bit may have been stored in the PRD when it was initialized to indicate, for example, whether the blocks within a parallel region are dependent such that they all should be completed before subsequent instructions following that parallel region are begun. In that situation, the compiler includes a TEST DEPENDENCY BIT instruction in the sequence following the XPR instruction. If an exiting processor finds the dependency bit set, it may then set an IDLE bit in its own PSW as a flag to the operating system that it is available to work on a different thread. The last processor to exit the parallel region clears the dependency bit before executing the TEST instruction and then simply proceeds to the instructions that follow the parallel region.

The dynamic allocation of register sets 24 has thus been achieved by atomic operations (i.e., those performed by a processor on memory in such a way that no other processor can access the memory during the operations). The register sets are assigned dynamically by the processors themselves without stopping the execution of the processors. The assigments are accomplished quickly by a small number of instructions so that assignments and reassignments can be made frequently with an acceptable overhead cost. Conflicts between processors are avoided.

In addition, the operation of multiple processors within a parallel region of any given machine instruction sequence is managed by the processor themselves by executing atomic instructions inserted in the instruction sequence itself.

Other embodiments are within the following claims.

For example, some processors could be operating concurrently in one process in one shared memory, while other processors could be operating concurrently in another process in another shared memory, and the concurrencies could be controlled in the same manner.

We claim:

1. A computer system comprising
   a plurality of processors working within sections of a stored machine instruction sequence, and
   storage containing said machine instruction sequence including parallel control instructions which are of a kind and have such locations in the instruction sequence that, when executed by said processors, enable each one of said processors to proceed from section to section based on status information about a state of execution of said sections by said processors, without interrupting the execution of said machine instruction sequence.

2. The system of claim 1 wherein said sections are parallel regions, and said status information is held in storage that is shared by said multiple processors.

3. The system of claim 1 wherein
said status information includes a flag indicating when a region has been completely executed, and
said parallel control instructions cause a processor which is a most recent processor to leave said region upon its completion to set said flag, and prevent said processors from thereafter entering said region as a result of their consulting said flag.

4. The system of claim 2 wherein
each one of said parallel regions includes independent blocks that can be executed respectively by different processors such that conflicts between said processors executing said blocks are precluded as a result of consulting information stored in one of a plurality of register sets assigned in common to said processors,
said status information includes a value that indicates which register set has been assigned to processors executing in a parallel region, and
said parallel control instructions cause each processor, when entering said parallel region, to assign to itself a register set that is the same as a register set assigned to other processors executing within said parallel region, based on said register set indicator value.

5. The system of claim 1 wherein said status information includes the number of said processors that are actively executing within each said section, and said number is incremented and decremented by processors entering and leaving said section.

6. The system of claim 2 wherein said status information includes a parallel region descriptor for each parallel region in said machine instruction sequence.

7. The system of claim 2 wherein
each one of said parallel regions includes independent blocks that can be executed respectively by different processors such that conflicts between said processors executing said blocks are precluded as a result of consulting information stored in a resister set assigned in common to said processors, and wherein
when all said processors have temporarily left a parallel region before execution of said parallel region is completed, the information in said resistor set is temporarily stored as part of said status information in said shared storage, and is reloaded in said resister set when execution of said parallel region resumes.

8. The system of claim 1 wherein said machine instruction sequence is any arbitrary sequence.

9. The system of claim 2 wherein said parallel control instructions include an enter parallel region instruction at a beginning of each one of said parallel regions that is executed by each processor that reaches said parallel region.

10. The system of claim 2 wherein said parallel region control instructions include an exit parallel region instruction at an end of each one of said parallel regions that is executed by each processor that leaves the parallel region after completing a block in said parallel region.

11. A method for enabling multiple processors to regulate their work within sections of a stored machine instruction sequence, comprising
storing status information about a state of execution of said sections by said processors, and
including, in the machine instruction sequence, parallel control instructions which enable each one of said processors to proceed from section to section based on said status information without interrupting the execution of said machine instruction sequence.

* * * * *